United States Patent
Frazier et al.

(10) Patent No.: US 10,474,467 B2
(45) Date of Patent: *Nov. 12, 2019

(54) PROCESSOR INSTRUCTION SEQUENCE TRANSLATION

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 412 days.

This patent is subject to a terminal disclaimer.

(21) Appl. No.: 14/824,410

(22) Filed: Aug. 12, 2015

(65) Prior Publication Data

US 2017/0046157 A1 Feb. 16, 2017

(51) Int. Cl.
*G06F 9/30* (2018.01)
*G06F 9/38* (2018.01)
*G06F 12/0875* (2016.01)

(52) U.S. Cl.
CPC ...... *G06F 9/30181* (2013.01); *G06F 9/30145* (2013.01); *G06F 9/3802* (2013.01); *G06F 9/3812* (2013.01); *G06F 12/0875* (2013.01); *G06F 2212/1016* (2013.01); *G06F 2212/452* (2013.01)

(58) Field of Classification Search
CPC .......... G06F 2212/1016; G06F 9/3802; G06F 12/0875; G06F 2212/452; G06F 9/3812; G06F 9/30181; G06F 9/30145
See application file for complete search history.

(56) References Cited

U.S. PATENT DOCUMENTS

| | | | | |
|---|---|---|---|---|
| 5,257,360 A | * | 10/1993 | Schnizlein | G06F 9/3804 365/230.03 |
| 5,619,665 A | * | 4/1997 | Emma | G06F 9/30174 703/26 |
| 8,904,151 B2 | | 12/2014 | Gschwind et al. | |
| 2007/0260855 A1 | * | 11/2007 | Gschwind | G06F 9/30014 712/213 |
| 2013/0086570 A1 | | 4/2013 | Blainey et al. | |

OTHER PUBLICATIONS

Intel, "Intel® 64 and IA-32 Architectures Optimization Reference Manual", Order No. 248966-026, http://www.intel.in/content/dam/doc/manual/64-ia-32-architectures-optimization-manual.pdf, Apr. 2012, p. 2-34 and pp. 3-18-3-22.
IBM "List of IBM Patents or Patent Applications Treated as Related" submitted on Sep. 25, 2015.
U.S. Appl. No. 14/868,660, entitles Processor Instruction Sequence Translation, filed Sep. 29, 2015.

* cited by examiner

*Primary Examiner* — Benjamin P Geib
*Assistant Examiner* — Kasim Alli
(74) *Attorney, Agent, or Firm* — Patterson + Sheridan, LLP

(57) ABSTRACT

Computer readable medium and apparatus for translating a sequence of instructions is disclosed herein. In one embodiment, an operation includes recognizing a candidate multi-instruction sequence, determining that the multi-instruction sequence corresponds to a single instruction, and executing the multi-instruction sequence by executing the single instruction.

12 Claims, 9 Drawing Sheets

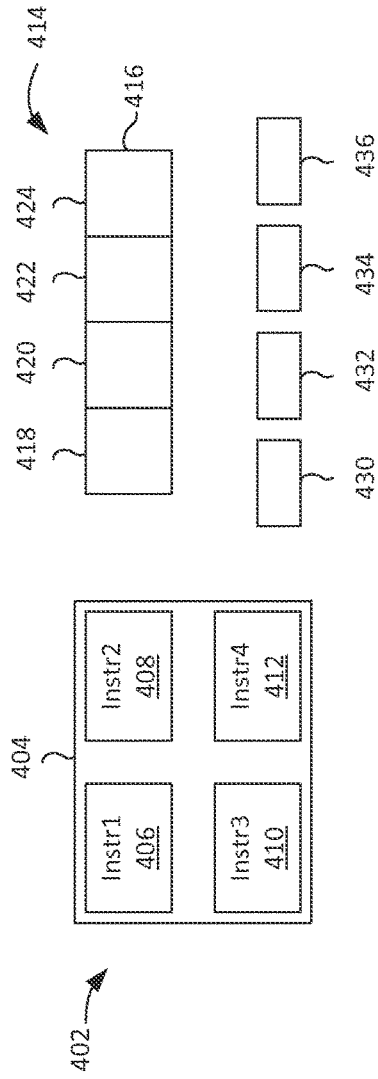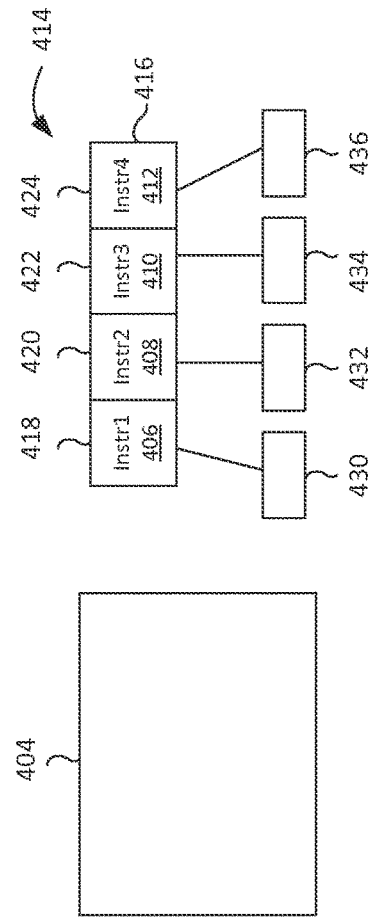
FIG. 4A
FIG. 4B

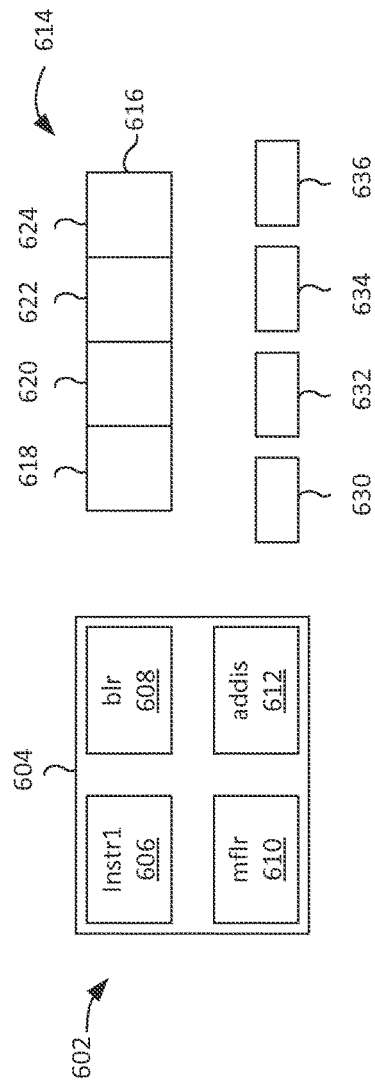
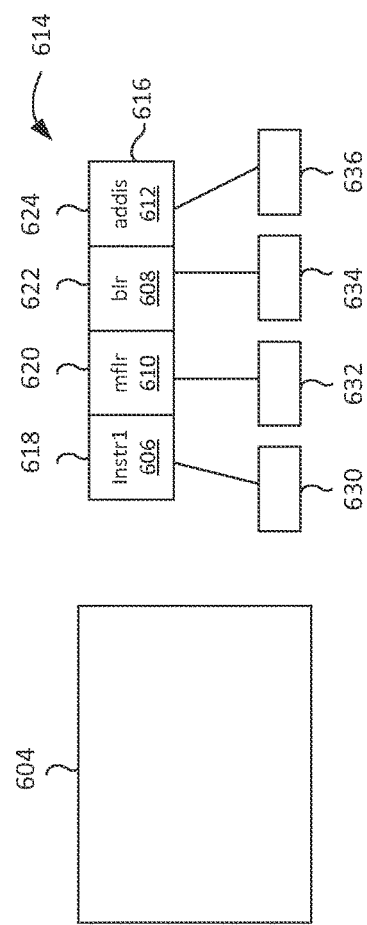
FIG. 6A
FIG. 6B

PROCESSOR INSTRUCTION SEQUENCE TRANSLATION

BACKGROUND

Embodiments of the present disclosure relate to the field of computing systems, and more specifically, to processor design.

An instruction set, or instruction set architecture (ISA) of a computer processor architecture include a specification of machine language instructions (i.e., opcodes) and the native commands implemented by a particular processor. Instruction set architectures are sometimes classified as complex instruction set computers (CISC) having many specialized instructions, or reduced instruction set computers (RISC), having a limited set of frequently used instructions. An ISA may undergo changes in architecture as instructions are added, removed, and/or modified through successive generations. Recent advances in processor technology have enabled processors to support more powerful instructions that perform the same function that previously required two or more instructions.

SUMMARY

According to another embodiment, a system is disclosed herein. The system includes a processor and a memory. The memory stores program code, which, when executed on the processor performs an operation for translating a sequence of instructions. The operation includes recognizing a candidate multi-instruction sequence, determining that the multi-instruction sequence corresponds to a single instruction, and executing the multi-instruction sequence by executing the single instruction.

According to yet another embodiment, a computer readable storage medium having stored thereon instructions that when executed by a processor causes a processor to perform an operation for translating a sequence of instructions. The operation includes recognizing a candidate multi-instruction sequence, determining that the multi-instruction sequence corresponds to a single instruction, and executing the multi-instruction sequence by executing the single instruction.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4C illustrate a diagram of translating a sequence of instructions, according to one embodiment disclosed herein.

FIGS. 6A-6C illustrate a diagram of translating a sequence of instructions, according to yet another embodiment disclosed herein.

For clarity, identical reference numerals have been used, where applicable, to designate identical elements that are common between figures. Additionally, elements of one embodiment may be adapted for use with other embodiments.

DETAILED DESCRIPTION

Figure 1:
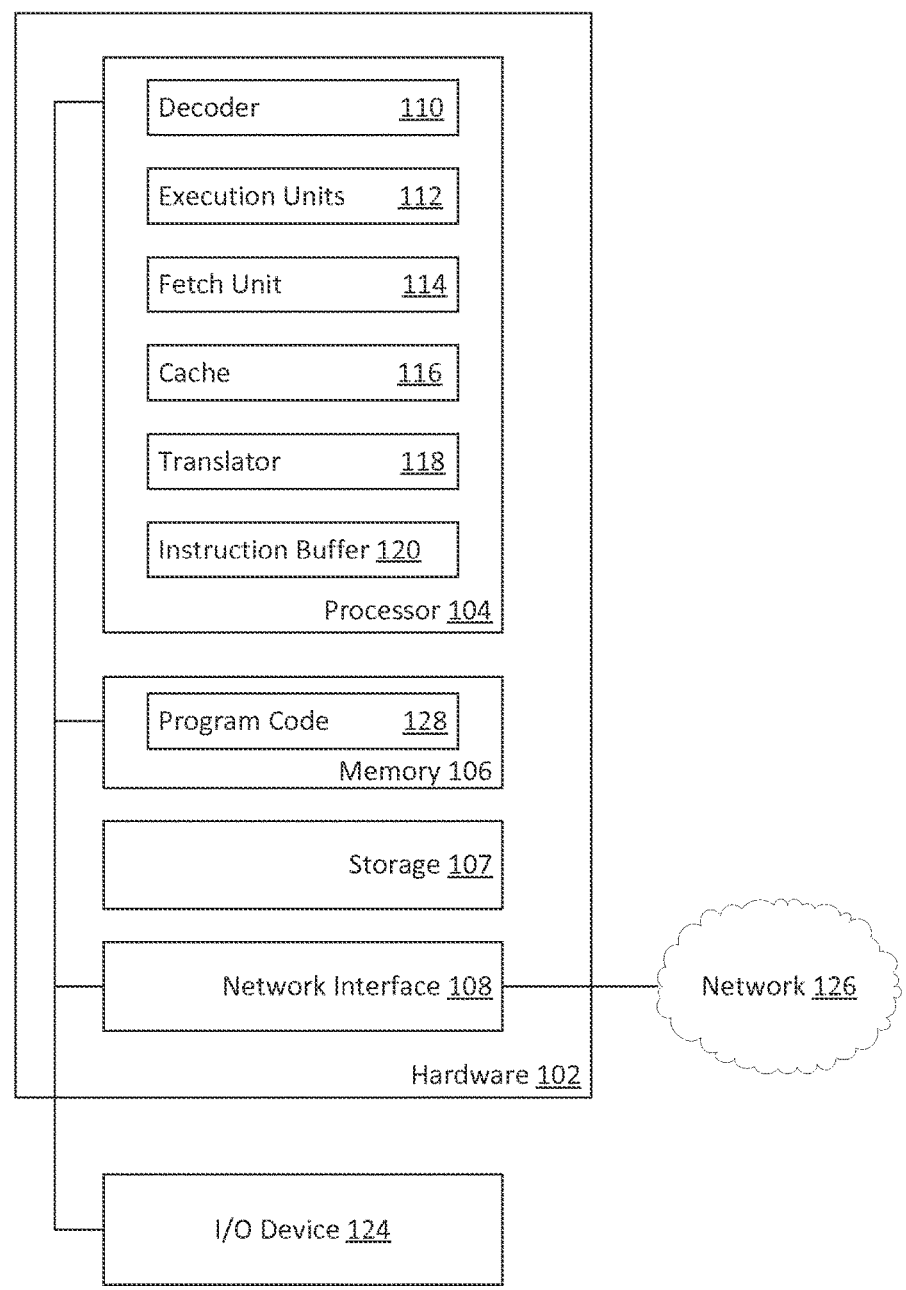
FIG. 1 illustrates a computing environment, according to one embodiment disclosed herein.

FIG. 1 illustrates a computing system 100 according to one embodiment. The computing system 100 includes hardware components 102, including a processor 104, a memory 106, storage 107, and a network interface 108. The computing system 100 also includes an I/O device 124 (e.g. keyboard and mouse devices) connected to the computing system 100.

In one embodiment, the processor 104 retrieves and executes programming instructions stored in memory 106 (e.g., program code 128) as well as stores and retrieves application data residing in the memory 106. The processor 104 is included to be representative of a single processor, multiple processors, a single processor having multiple processing cores, and the like. The processor 104 includes a plurality of hardware modules configured for fetching, decoding, and executing programming instructions, including, among other modules, a decoder 110, execution units 112, a fetch unit 114, a cache 116, a translator 118, and an instruction buffer 120. The plurality of hardware modules may be comprised of circuitry, logic elements, and other electrical elements. The cache 116 holds instructions that have not yet been assigned to an execution unit 112. The decoder 110 is configured to take an instruction from the cache 116, determine what type of instruction it is, and send it to a corresponding execution unit 112. For example, the decoder 110 may receive an add instruction from the cache 116, recognize that the instruction is an add instruction, and send the add instruction to an arithmetic execution unit 112. In one or more embodiments, the translator 118 is configured to recognize that a sequence of instructions is performing the same function as a single, more powerful instruction. This allows later programs that use the sequence of instructions to use only the single instruction generated by the translator 118. The fetch unit 114 is configured to grab an instruction block from the instruction buffer 120. The execution units 112 handle the execution of instructions.

In one embodiment, the memory 106 is generally included to be representative of a random access memory. The memory 106 includes program code 128 having a plurality of program instructions. For example the plurality of program instructions may include a candidate multi-instruction sequence. The storage 107 may be a disk drive storage device. Although shown as a single unit, the storage 107 may be a combination of a fixed and/or removable storage devices, such as fixed disc drives, removable memory cards, optical storage, network attached storage (NAS), or storage-area-network (SAN). The network interface 108 may be any type or network communications allowing the computing system 100 to communicate with other computers via a network 126.

The processor 104 is configured to support a particular instruction set architecture (ISA), including a specification of opcodes and other instructions implemented by the processor 104. It is noted that the particular ISA may be part of an evolving instruction set, embodied in successive releases with new instructions added and current instructions maintained, removed, and/or modified. In one example, the processor 104 may be similar to other processors that supports a particular ISA (e.g., PowerPC), except that the processor 104 may support a newer version of the ISA. However, when new processors that support new instructions (i.e., newer generations of the ISA) become available, application programs written for older processors of the ISA may have to be updated to use the new instructions and thereby improve performance and decrease the application footprint. For example, program code 128 may comprise computer instructions for an application program that was written for and/or compiled for a target processor of the ISA that is a predecessor of the processor 104. Because a very large number of users either cannot or do not wish to update their programs, these users do not receive any advantage that the new instructions provide, even if their programs execute on the new systems that provide the new instruction (i.e., the processor 104).

Accordingly, in one or more embodiments, a scheme is described that enables older application programs to experience improved performance when executing on newer processors that support more powerful instructions (e.g., processor 104) even though the programs do not explicitly use the new instructions. The described embodiments enable legacy code to exhibit significantly improved performance when executing on newer processors, which increases the utility and adoption rate of newer processors.

In one or more embodiments, the processor 104 is configured to provide an "instruction translator" within the processor 104 that recognizes that a sequence of instructions is performing the same function as a single, more powerful instruction (or as a more powerful, more concise sequence of instructions less than the original sequence of instructions). As described in detail below, the processor 104 translates the sequence to the new instruction, on-the-fly (i.e., at execution time or run-time), without having to re-compile or re-write the legacy code.

Figure 2:
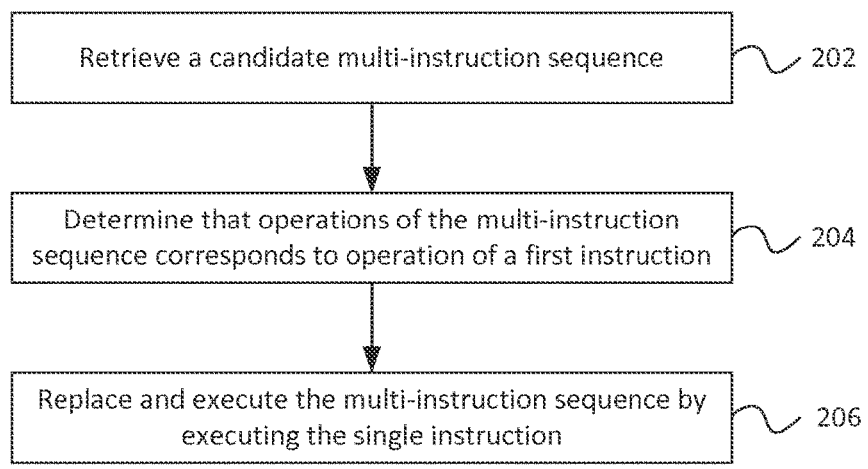
FIG. 2 illustrates a method of merging blocks of instructions, according to one embodiment disclosed herein.

FIG. 2 illustrates a method 200 for translating a sequence of instructions, according to one embodiment. The method 200 begins at step 202 by retrieving a candidate multi-instruction sequence from memory for execution by a processor. A translator, such as translator 118 in FIG. 1, is configured to recognize a candidate multi-instruction sequence. The translator scans a block of instructions in a cache to determine if the instructions contain any multi-instruction sequence. At step 204, the translator determines whether the operations of the multi-instruction sequence is corresponds to or is functionally equivalent to operation of a first instruction supported the processor. If so, the translator replaces the multi-instruction sequence with the first instruction. It is understood this process may occur in real-time during execution of the program instructions. To do this, the translator may shift the block of instructions through an instruction buffer that contains logic that can recognize when opcodes of the instruction sequence appear in the proper order and are independent.

At step 206, an execution unit, such as execution unit 112 in FIG. 1, executes the multi-instruction sequence by executing said single instruction. As described above, the translator replaces the multi-instruction sequence with the corresponding single instruction. As described below, the translator may extract and use instruction arguments and parameters found within the multi-instruction sequence to form a new single instruction with the same arguments and parameters.

A decoder, such as decoder 110 in FIG. 1, transfers the single instruction to the execution unit.

Figure 3:
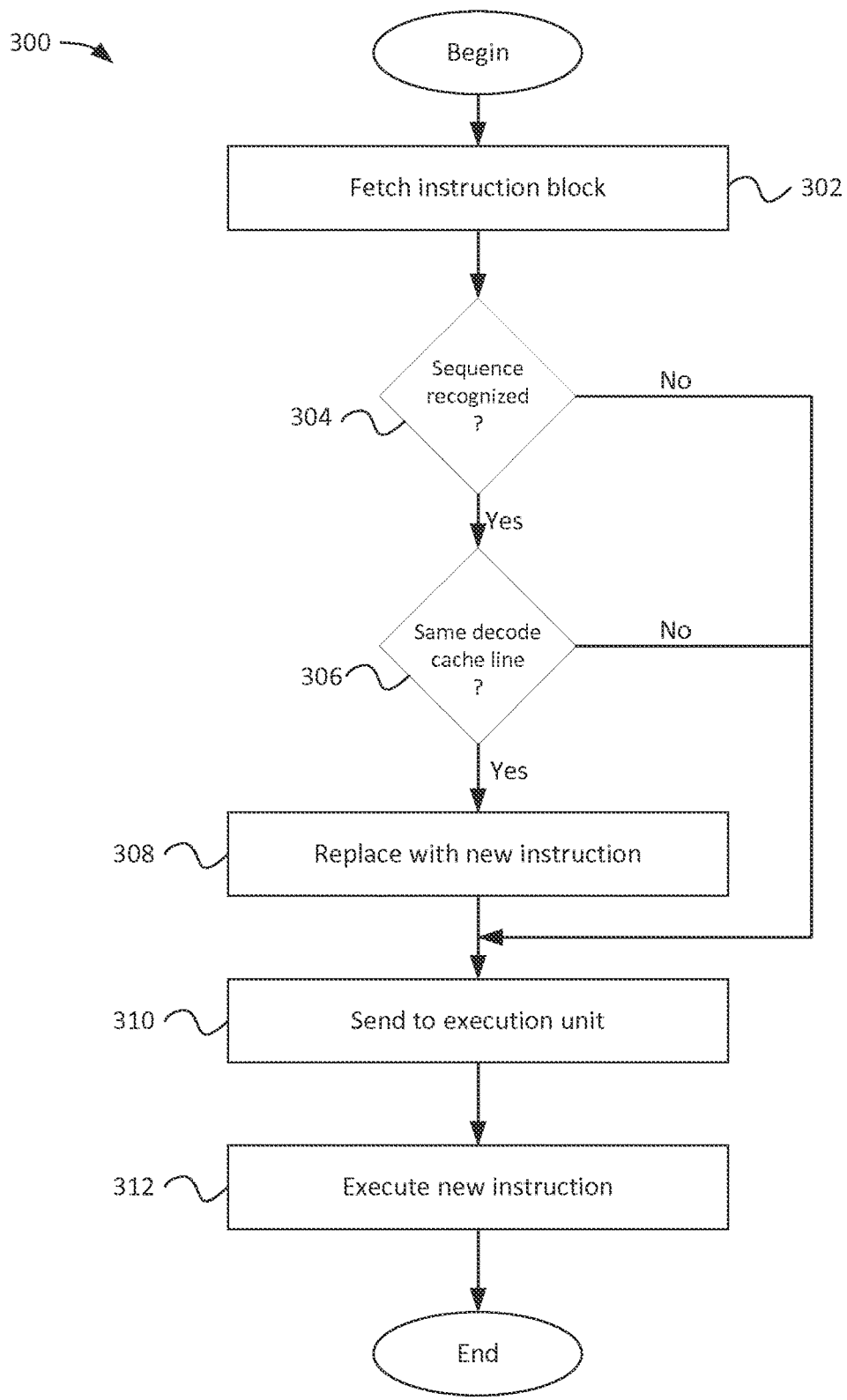
FIG. 3 illustrates a block diagram of a method of translating a sequence of instructions, according to one embodiment disclosed herein.

FIG. 3 illustrates a block diagram of a method 300 of translating a sequence of instructions, according to one embodiment. The method 300 begins at step 302 where the fetch unit 114 fetches an instruction. The fetch unit 114 transfers the instruction block to the cache. The translator 118 scans the instructions in the cache to determine whether the instructions contain the instruction sequence that corresponds to the new instruction. At decision block 304, the translator 118 determines whether the instruction sequence is recognized. For example, the translator 118 may recognize the instruction sequence by shifting the instruction block through an instruction buffer that contains logic that can recognize when opcodes of the instruction sequence appear in the proper order and are interdependent. If the sequence is not recognized, at step 310, the sequence is left intact and sent to an execution unit. Because the sequence was not recognized, the sequence is not replaced with a new, single instruction. If, however, the sequence is recognized, at decision block 306, the translator 118 determines whether the instruction sequence is fully contained in a single cache line. If the instruction sequence is contained in a single cache line, at step 308 the translator replaces the instruction sequence with the new instruction in the cache, where it will be sent to an execution unit 112 by the decoder 110 in step 310. At step 312, the instruction sent to the execution unit 112 is executed.

The sequence is not replaced when it will not fit within a cache line because, if it becomes necessary to re-access the cache line, all instructions in the sequence need to be recaptured to ensure that the instruction sequence will again be recognized.

Figure 4C:
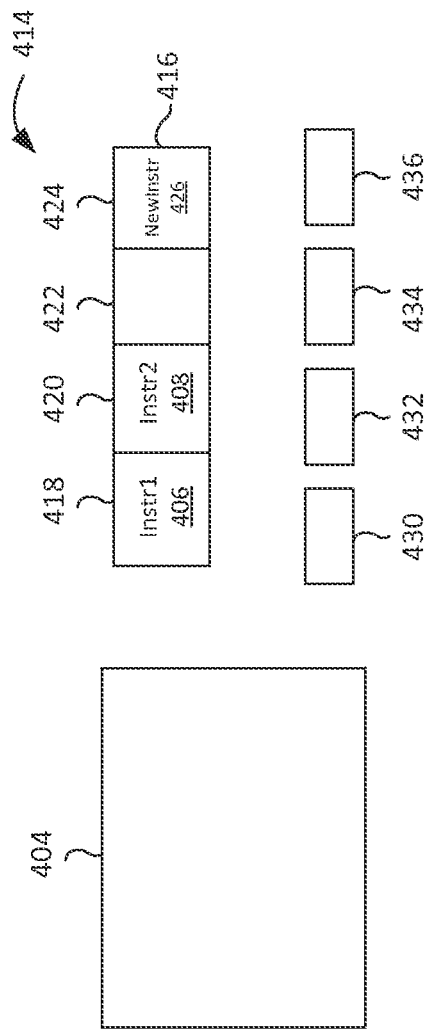

FIGS. 4A-4C illustrate a diagram of a method for translating a sequence of instructions, according to one embodiment. FIG. 4A illustrates an example of an instruction sequence that performs the same function as a more powerful single instruction. A plurality of instructions 402 are stored in an instruction buffer 404. Illustratively, the plurality of instructions 402 may include instruction one (Instr1) 406, instruction two (Instr2) 408, instruction three (Instr3) 410, and instruction four (Instr4) 412. The instructions 402 will be transferred to the cache 414 by a fetch unit, such as fetch unit 114 in FIG. 1. The cache 414 includes a plurality of cache lines 416. Illustratively, only one cache line 416 is shown in FIG. 4. The cache line 416 may be segmented into a plurality of sections. For example, the cache line 416 is segmented into four sections, 418, 420, 422, and 424. Each section 418-424 is configured to contain one instruction 402. Each section 418-424 corresponds to an execution unit in the plurality of execution units 430-436. For example, section 418 may correspond to execution unit 430, section 420 may correspond to execution unit 432, section 422 may correspond to execution unit 434, and section 424 may correspond to execution unit 436. A decoder, such as decoder 110 in FIG. 1, takes the instructions 402 once placed in the cache and sends them to a corresponding execution unit. Other embodiments may contain a single execution unit or a different number of execution units.

FIG. 4B illustrates the instruction buffer 404 and the cache line 416 after the fetch unit transfers the instructions 402 to the cache line 416. Each instruction 402 is within a respective section 418-424. For example, as shown in FIG. 4B, Instr1 406 is in section 418, Instr2 408 is in section 420, Instr3 410 is in section 422, and Instr4 412 is in section 424. A translator, such as translator 118 in FIG. 1, scans the instructions 402 in the cache line 416 to determine whether the instructions 402 contain an instruction sequence that corresponds to a new instruction. If the instructions 402 contain an instruction sequence that corresponds to a new instruction, the translator will replace the instructions 402 with a new instruction.

FIG. 4C illustrates the instruction buffer 404 and the cache line 416 after the translator scans the instructions 402. The translator scanned the instructions 402 in cache line 416 and determined that Instr3 410 and the Instr4 412 correspond to a new instruction (NewInstr) 426. To do this, the translator shifted the instructions Instr1 406, Instr2 408, Instr3 410, and Instr4 412 through an inspection buffer (not shown) that contains logic that is able to recognize when opcodes of an instruction sequence appear in the proper order and are interdependent. The NewInstr 426 takes the place of Instr3 410 and Instr4 412 in the cache line 416. In some embodiments, the merged instructions do not have to be adjacent, if the instructions are dependent and the intervening instructions do not interfere with the translation. As a result, a free section in the cache line 416 opens up, and there is one less instruction to send to the execution units 430-1036.

Figure 5A:
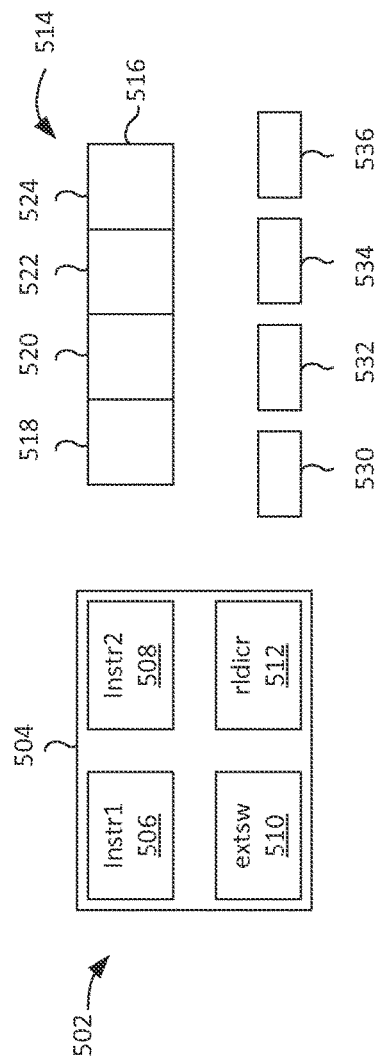
FIGS. 5A-5C illustrate a diagram of translating a sequence of instructions, according to another embodiment disclosed herein.
Figure 5B:
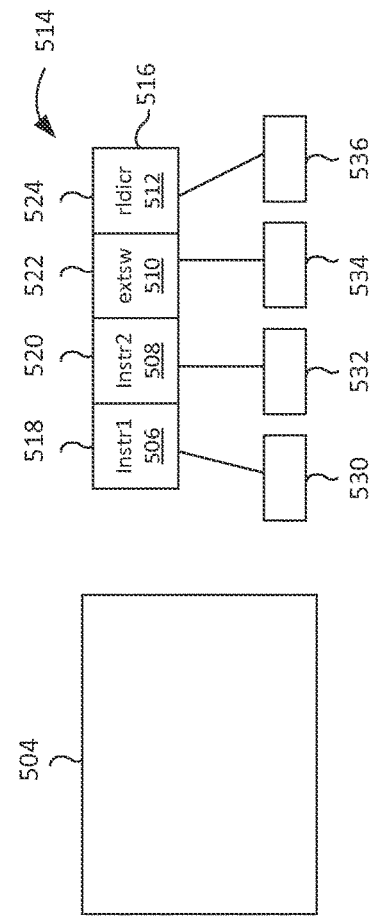
Figure 5C:
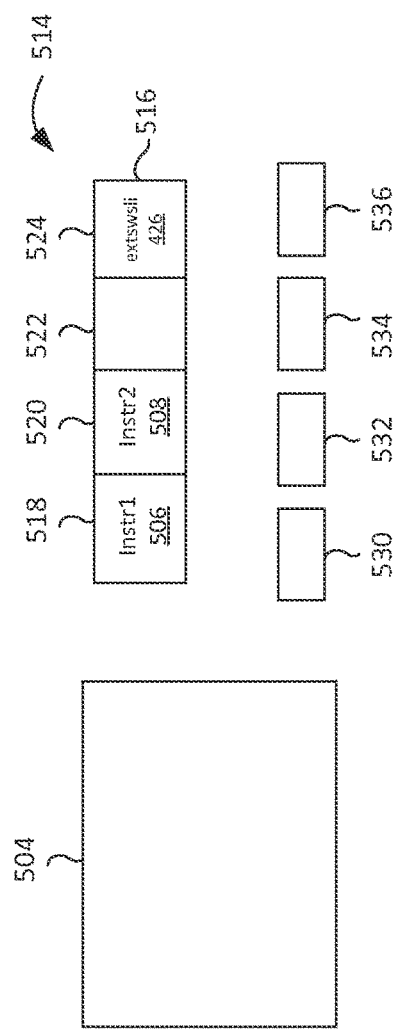

FIGS. 5A-5C illustrates a diagram of a method for translating a sequence of instructions, according to one embodiment. FIG. 5A illustrates an example of an instruction sequence that performs the same function as a more powerful single instruction. The instructions 502 are stored in the instruction buffer 504. The plurality of instructions 502 may include instruction one (Instr1) 506, instruction two (Instr2) 508, extend sign word (extsw) instruction 510, and a rotate left double word immediate then clear right (rldicr) instruction 512. The instructions 502 will be transferred to the cache 514 by a fetch unit. The cache 514 includes a plurality of cache lines 516. Illustratively, only one cache line 516 is shown in FIG. 5. The cache line 516 is segmented into four sections, 518, 520, 522, and 524. Each section 518-524 is configured to contain one instruction 502. Each section may correspond to an execution unit in the plurality of execution units 530-536, or there may be one or any other number of execution units. For example, if there are multiple execution units, section 518 may correspond to execution unit 530, section 520 may correspond to execution unit 532, section 522 may correspond to execution unit 534, and section 524 may correspond to execution unit 536. A decoder takes the instructions 502 once placed in the cache and sends them to a corresponding execution unit.

FIG. 5B illustrates the instruction buffer 504 and the cache line 516 when the fetch unit transfers the instructions 502 to the cache line 516. Each instruction 502 is within a respective section 518-524. For example, as shown in FIG. 5B, Instr1 506 is in section 518, instr2 508 is in section 520, etsw instruction 510 is in section 522, and rldicr instruction 512 is in section 524. A translator, such as translator 118 in FIG. 1, scans the instructions 502 in the cache line 516 to determine whether the instructions 502 contain an instruction sequence that corresponds to a new instruction. If the instructions 502 contain an instruction sequence that corresponds to a new instruction, the translator will replace the instructions 502 with a new instruction.

FIG. 5C illustrates the instruction buffer 504 and the cache line 516 after the translator scans the instructions 502. The translator scanned the instructions 502 in cache line 516 and determined that the extsw instruction 510 and the rldicr instruction 512 correspond to a new instruction, extend sign word shift left immediate (extswsli) instruction 526. The new instruction 526 takes the place of the extsw instruction 510 and the rldicr instruction 512 in the cache line 516. As a result, a free section in the cache line 516 opens up, and there is one less instruction to send to the execution units 530-536.

EXAMPLE TWO

Figure 6C:
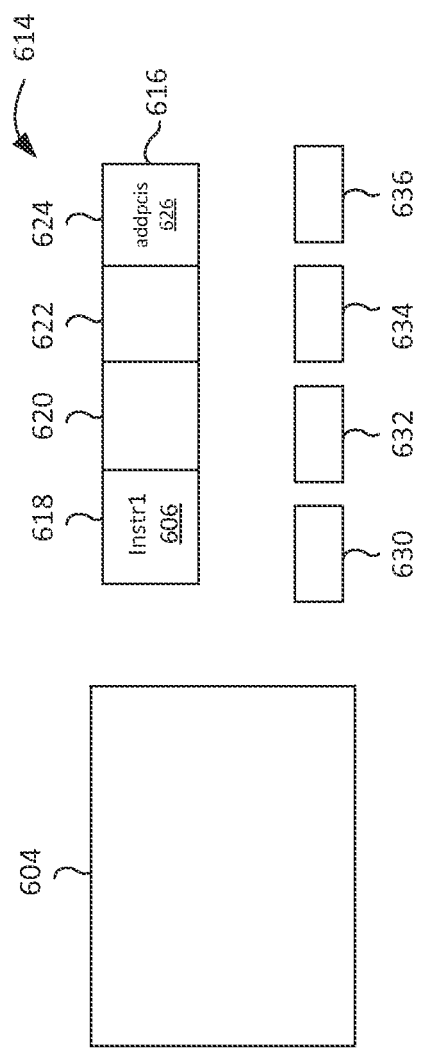

FIGS. 6A-6C illustrates a diagram of a method for translating a sequence of instructions, according to one embodiment. FIG. 6A illustrates an example of an instruction sequence that performs the same function as a more powerful single instruction. A plurality of instructions 602 are stored in the instruction buffer 604. The plurality of instructions 602 may include instruction one (Instr1) 606, the branch to link register (blr) instruction 608, the move from link register (mflr) instruction 610, and add immediate shift (addis) instruction 612. The instructions 602 will be transferred to the cache 614 by a fetch unit. The cache 614 includes a plurality of cache lines 616. Illustratively, only one cache line 616 is shown in FIG. 6. The cache line 616 is segmented into four sections, 618, 620, 622, and 624. Each section 618-1024 is configured to contain one instruction 602. Each section corresponds to an execution unit in the plurality of execution units 630-636. For example, section 618 may correspond to execution unit 630, section 620 may correspond to execution unit 632, section 622 may correspond to execution unit 634, and section 624 may correspond to execution unit 636. A decoder takes the instructions 602 once placed in the cache and sends them to a corresponding execution unit.

FIG. 6B illustrates the instruction buffer 604 and the cache line 616 when the fetch unit transfers the instructions 602 to the cache line 616. Each instruction 602 is within a respective section 618-624. For example, as shown in FIG. 6B, Instr1 606 is in section 618, mflr instruction 610 is in section 620, blr instruction 608 is in section 622, and addis instruction 612 is in section 624. A translator, such as translator 118 in FIG. 1, scans the instructions 602 in the cache line 616 to determine whether the instructions 602 contain an instruction sequence that corresponds to a new instruction. If the instructions 602 contain an instruction sequence that corresponds to a new instruction, the translator will replace the instructions 602 with a new instruction.

FIG. 6C illustrates the instruction buffer 604 and the cache line 616 after the translator scans the instructions 602. The translator scanned the instructions 602 in cache line 616 and determined that the blr instruction 608, the mflr instruction 610, and the addis instruction 612 correspond to a new instruction, add immediate shift to current instruction address (addpcis) instruction 626. The new instruction 626 takes the place of the blr instruction 608, the mflr instruction 610, and the addis instruction 612 in the cache line 616. As a result, two free sections in the cache line 616 opened up, and there are two fewer instructions to send to the execution units 630-636 (or single execution unit or other number of execution units).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., translator) or related data available in the cloud. For example, the translator could execute on a computing system in the cloud and recognize whether a sequence of instructions perform the same function as a single, more powerful instruction, and store the new, single instruction in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A system, comprising:
a memory storing a block of program instructions; and
a processor comprising a translator module configured to:
fetch the block of program instructions and transfer the block of program instructions to a cache, wherein the block of program instructions spans a plurality of cache-lines in the cache;
scanning the block of program instructions in the cache to determine whether the plurality of instructions contain a multi-instruction sequence that corresponds to a first instruction by shifting the block of program instructions through an instruction buffer to recognize that opcodes of the multi-instruction sequence appear in a specific order and are interdependent;

determine whether the multi-instruction sequence is fully contained within a single line of the cache, wherein an intervening instruction that is not an instruction of the multi-instruction sequence is disposed between at least two instructions of the block of program instructions that constitute the multi-instruction sequence in the cache;

responsive to determining that the multi-instruction sequence is fully contained within a single line of the cache, replace the multi-instruction sequence with the first instruction in the cache, and execute the multi-instruction sequence by executing the first instruction, responsive to determining that the multi-instruction sequence is fully contained within more than a single line of the cache, execute individual instructions of the multi-instruction sequence in the block of program instructions.

2. The system of claim 1, wherein scanning the block of program instructions comprises:

scanning a first block of instructions to determine whether the first block of instructions is recognized.

3. The system of claim 1, further comprising determining that the multi-instruction sequence is fully contained within the single line of the cache subsequent to determining that operations of the multi-instruction sequence is functionally equivalent to operation of the first instruction.

4. The system of claim 1, wherein responsive to determining that the multi-instruction sequence is contained fully within the single line of the cache, replacing the multi-instruction sequence with a single instruction in the cache.

5. The system of claim 4, wherein the single instruction corresponds to the multi-instruction sequence.

6. The system of claim 4, wherein the multi-instruction sequence is replaced with the first instruction in a decode logic, such that an execution unit is not cognizant that the executed instruction corresponds to the executing of the multi-instruction sequence.

7. A computer readable storage medium having stored thereon instructions that when executed by a processor cause a processor to perform an operation for translating a sequence of instructions, comprising:

fetching a block of program instructions and transferring the block of program instructions to a cache, wherein the block of program instructions spans a plurality of cache-lines in the cache;

scanning the block of program instructions in the cache to determine whether the block of program instructions contain a multi-instruction sequence that corresponds to a first instruction by shifting the block of program instructions through an instruction buffer to recognize that opcodes of the multi-instruction sequence appear in a specific order and are interdependent;

determining whether the multi-instruction sequence is fully contained within a single line of the cache, wherein an intervening instruction that is not an instruction of the multi-instruction sequence is disposed between at least two instructions of the block of program instructions that constitute the multi-instruction sequence in the cache;

responsive to determining that the multi-instruction sequence is fully contained within a single line of the cache, replacing the multi-instruction sequence with the first instruction in the cache, and executing the multi-instruction sequence by executing the first instruction, responsive to determining that the multi-instruction sequence is fully contained within more than a single line of the cache, executing individual instructions of the multi-instruction sequence in the block of program instructions.

8. The computer readable storage medium of claim 7, wherein scanning the block of program instructions comprises:

scanning a first block of instructions to determine whether the first block of instructions is recognized.

9. The computer readable storage medium of claim 8, wherein responsive to determining that operations of the multi-instruction sequence is functionally equivalent to the first instruction, determining whether the first block of instructions can be fully contained in the single line of the cache.

10. The computer readable storage medium of claim 9, wherein responsive to determining that the first block of instructions can be fully contained in a single line of the cache, replacing the first block of instructions with a single instruction in the cache.

11. The computer readable storage medium of claim 10, wherein the single instruction corresponds to the multi-instruction sequence.

12. The computer readable storage medium of claim 10, wherein the multi-instruction sequence is replaced with the first instruction in a decode logic, such that an execution unit is not cognizant that the executed instruction corresponds to the executing of the multi-instruction sequence.

* * * * *